US005698240A

United States Patent [19]

Haguchi

[11] Patent Number: 5,698,240

[45] Date of Patent: Dec. 16, 1997

[54] COMPRESSION MOLDING APPARATUS

[75] Inventor: Hisoshi Haguchi, Okayama, Japan

[73] Assignee: Kabushiki Kaisha Mitsuishi Fukai Tekkosho, Bizen, Japan

[21] Appl. No.: 645,567

[22] Filed: May 14, 1996

[30] Foreign Application Priority Data

May 17, 1993 [JP] Japan .................................... 7-118331

[51] Int. Cl.[6] .................................................... B29C 43/32

[52] U.S. Cl. .......................... 425/419; 100/273; 264/319; 264/333; 425/451.2

[58] Field of Search ............................... 425/77, 78, 352, 425/354, 355, 419, 451.2, 451.7; 264/319, 333; 100/273, 289, 290

[56] References Cited

U.S. PATENT DOCUMENTS

| | | | |
|---|---|---|---|
| 4,929,165 | 5/1990 | Inaba et al. | 425/451.2 |
| 4,968,239 | 11/1990 | Inaba et al. | 425/451.2 |
| 5,066,217 | 11/1991 | Fukuzawa et al. | 425/451.7 |
| 5,110,283 | 5/1992 | Bluml et al. | 425/451.7 |
| 5,378,140 | 1/1995 | Asano et al. | 425/451.7 |

*Primary Examiner*—Jay H. Woo
*Assistant Examiner*—Joseph Leyson
*Attorney, Agent, or Firm*—Armstrong, Westerman, Hattori, McLeland & Naughton

[57] ABSTRACT

A compression molding apparatus adaptable for instantaneously applying a large pressurizing force in the final stage of compression molding having a simple design and at low cost. A gear is provided to a screw shaft for rotating through a pair of pinions by a pair of hydraulic motors, and a plunger compresses a composite material. In the final stage, by using a pair of pressure-mounting actuators provided in a pressure-mounting system, a compressed deformation takes place to instantaneously apply pressurizing force through the gear to the screw shaft by a torque arm and a lock-piece respectively.

4 Claims, 6 Drawing Sheets

COMPRESSION MOLDING APPARATUS

BACKGROUND OF THE INVENTION

1. Field of the Invention

This invention relates to a compression molding apparatus and, more particularly, to the compression molding apparatus for a firebrick.

2. Description of the Related Art

A conventional compression molding apparatus *1h* by using a hydraulic press, which is shown in FIG. 11, is broadly composed of: a press frame 2*h*, a hydraulic cylinder 5*h*, provided on the upper side of the press frame 2*h*, a pressurization block 4*h*, provided on the lower side of the hydraulic cylinder 5*h*, and a plunger 3.

In the aforementioned structure, a composite material A is placed in a cavity between a pedestal J and a metal mold I, and is then compressed by pressure from the plunger 3. The pressurization requires 600 mm of stroke and more than 1,500 tons of pressurized force.

Furthermore, repetitive high-speed pressurization, commonly known as "bumping down molding", has been adopted for high-density molding pressurization. That is, at the final stage of molding pressurization, a range of 0.1–0.3 mm of compressed deformation is repeated a multitude of times to increase the density of a molding.

In the art described thus far, a huge apparatus, capable of generating the necessary high pressure, is used to create a great force at the final stage of the compression. As a consequence, the present apparatus is costly due to the complicated circuitry and the various control valves used for speedily controlling the abundance of highly pressurized flowing oil. There is no convenient means in which the pressurized compression takes place in two stages instead of a fixed high-pressure from the initial stage to the final stage of the compression.

Incidentally, a mechanical friction press is not adequate in solving this disadvantage in view of the noise and vibration created during the pressurization process.

It is an object of the present invention to provide a low-cost compression molding apparatus having a simple structure capable of generating a great instantaneous pressurizing force necessary at the final stage of the compression.

SUMMARY OF THE INVENTION

According to the present invention, a compression molding apparatus, using a screw press to carry out a pressurization process by moving a pressurization block engaging a screw shaft, is provided therein with a gear fixed to the screw shaft, a driving device driving the gear through a pinion, and a pressure-mounting system engaging and disengaging the gear.

The pressure-mounting system is composed of: a torque arm fitted to the screw shaft to rotate, a mechanical clutch causing the torque arm and the gear to engage and disengage, and a pressure-mounting actuator coupled with the mechanical clutch.

Alternately, the pressure-mounting system is composed of: a torque arm fitted to the screw shaft to rotate, and is provided therein with a window at the end of the torque arm, a lock-piece provided in the window to slide in the radial direction and to have gear teeth selectively interlocking with the gear, a detachable actuator moving the lock-piece toward and away from the gear, and a pressure-mounting actuator fitted at the end of the torque arm to rotate.

The pressure-mounting system may also include: a base fixed outside of the gear, a detachable arm fitted to the base at the end of the detachable arm to rotate, a lock-piece having gear teeth selectively interlocking with the gear and moving to slide along a guiding shaft provided to the detachable arm, a pressure-mounting actuator moving the lock-piece toward and away from the gear, and a detachable actuator fitted to the end of the detachable arm.

Alternately, the pressure-mounting system may be composed of: a U-shaped base fixed to the upper side of the gear, a guide arm provided at the base to slide in the radial direction of the gear, a detachable actuator provided between the guide arm and the base, a lock-piece having gear teeth selectively interlocking with the gear and moving to slide along a guiding shaft of the guide arm, and a pressure-mounting actuator causing the lock-piece to move toward and away from the gear.

In the compression molding apparatus structure described above, the screw shaft is rotated by the driving device in order to compress, for example, a composite material for a firebrick. At the final stage, when compression molding is advanced, the pressure-mounting system is capable of engaging and disengaging the gear to the pressurization necessary for the completion of the compression molding.

DETAILED DESCRIPTION OF THE PREFERRED EMBODIMENT(S)

Figure 11:
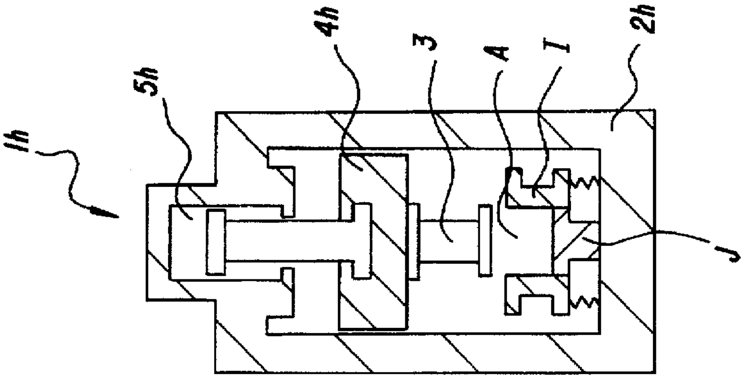
Fig.11 PRIOR ART
FIG. 11 is a side sectional view of a conventional compression molding apparatus by using a hydraulic press.

The preferred embodiments of the present invention will now be described with reference to the attached drawings. Incidentally, in the attached drawings, the same reference numerals will be used to designate the same or similar components or parts corresponding to FIG. 11, so that the description will be omitted or simplified.

Figure 1:
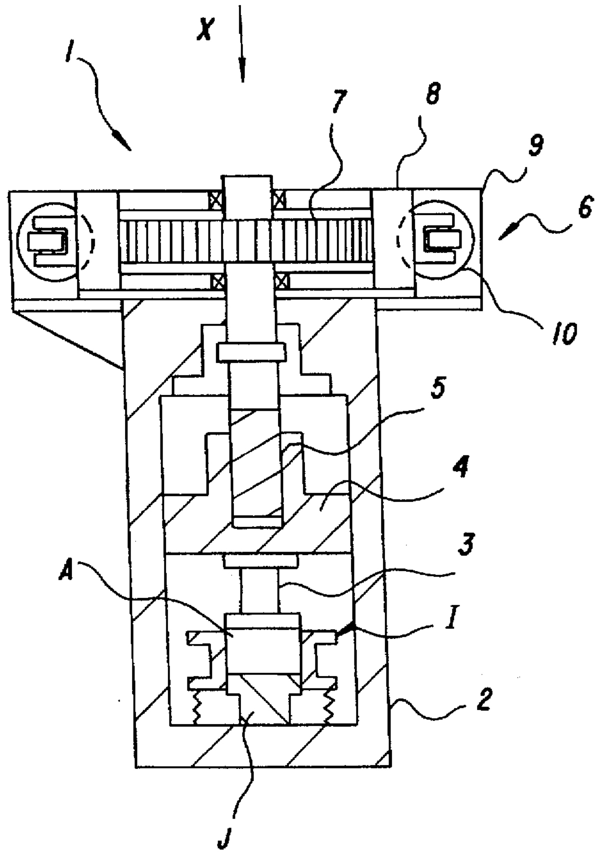
FIG. 1 is a side sectional view showing a preferred embodiment of the present invention.
Figure 2:
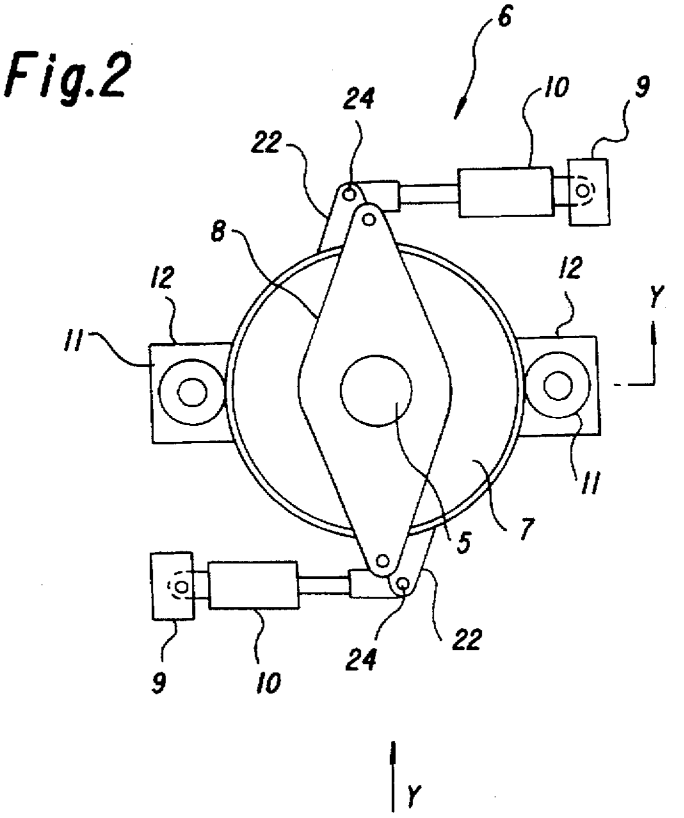
FIG. 2 is a view shown from the X direction in FIG. 1.
Figure 3:
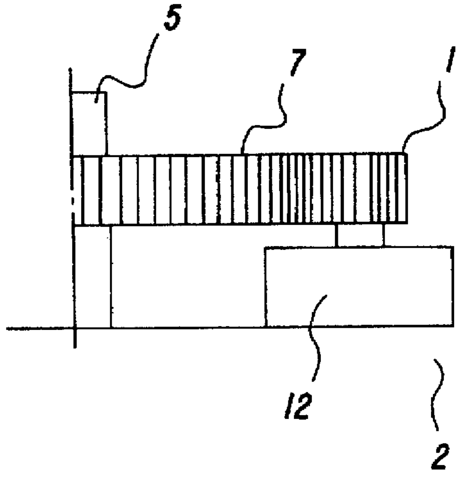
FIG. 3 is a view shown from the Y direction in FIG. 2.

In FIG. 1 to FIG. 3, a screw shaft 5 is rotatably provided in the upper side of a press frame 2 of a compression molding apparatus 1. A pressurization block 4, engaged with the screw shaft 5, is provided to slidably move in the axial direction to be engaged with the press frame 2 in a rotating manner. A gear 7 is fixed on the upper side of the screw shaft 5. The gear 7 is driven through a pair of pinions 11 provided symmetrically to the shaft by a driving device such as a pair of hydraulic motors 12. The two hydraulic motors 12 are each connected to a hydraulic pump (not shown) and are adapted to rotate at a high-speed in both directions. The driving device may use a geared motor capable of switching the direction of the rotation. The gear 7 is provided with a pressure-mounting system identified by reference numeral 6.

Figure 4:
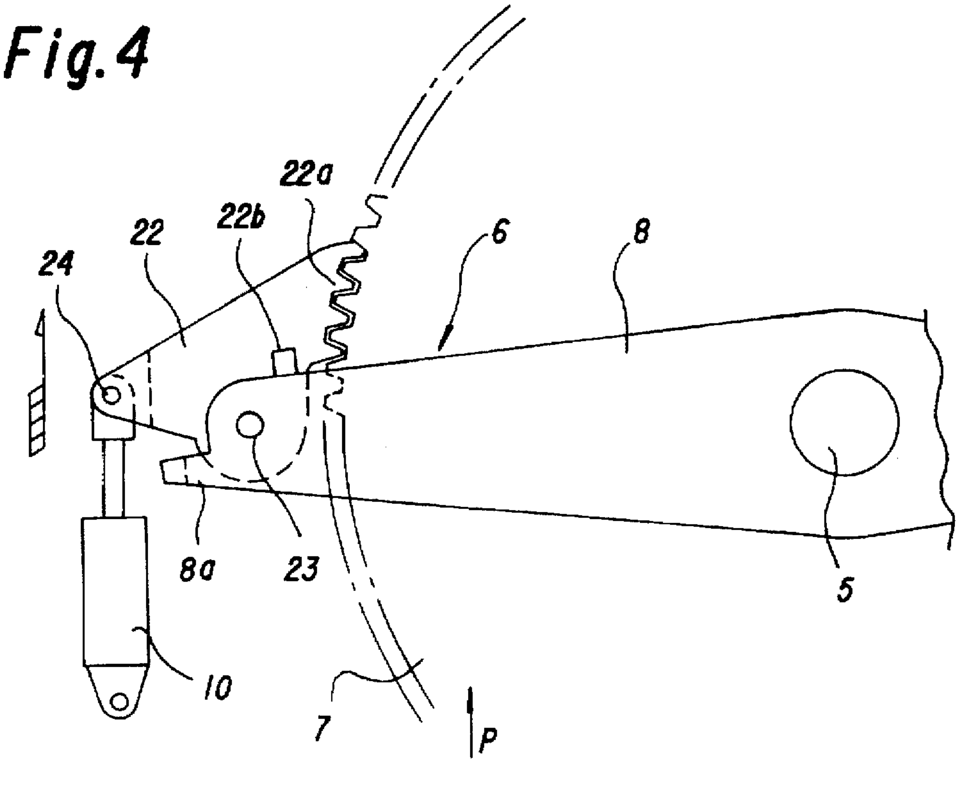
FIG. 4 is a plan view of a pressure-mounting system shown in FIG. 1.
Figure 5:
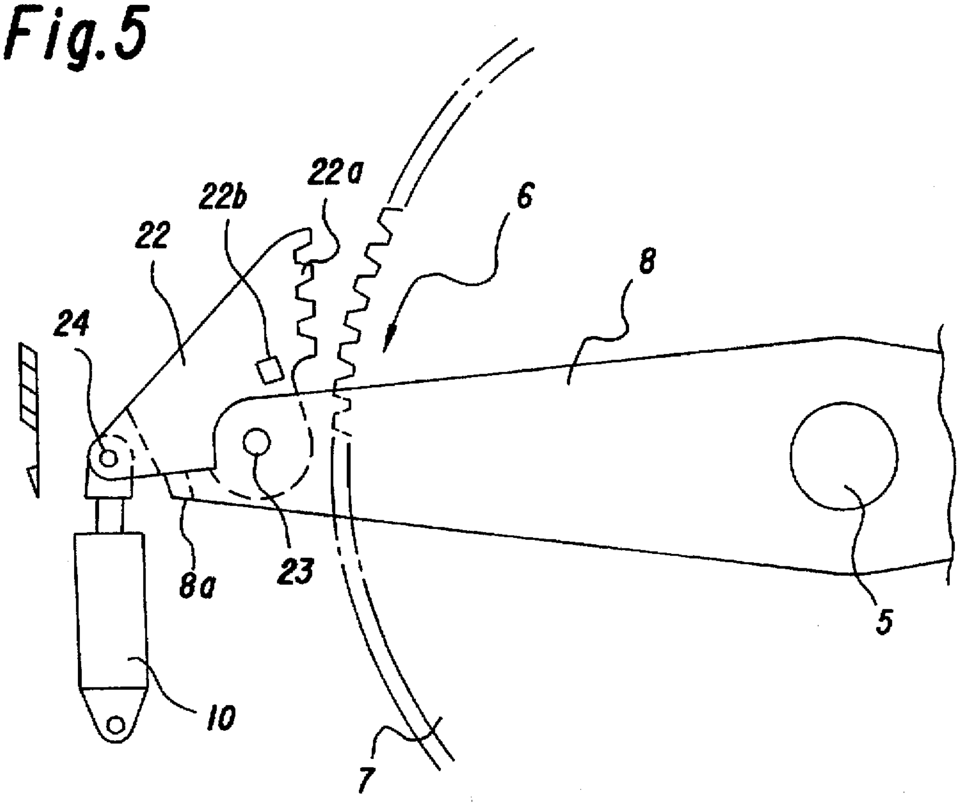
FIG. 5 is a plan view showing an OFF state of gear teeth shown in FIG. 4.
Figure 6:
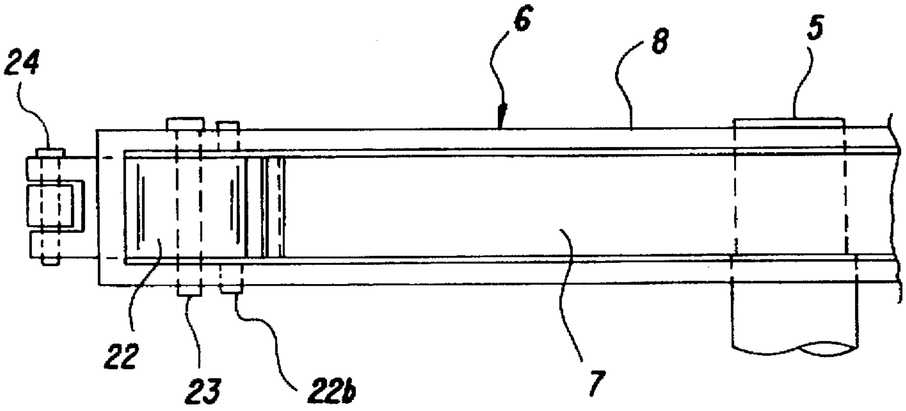
FIG. 6 is a view shown from the direction P in FIG. 4.

In FIG. 4 to FIG. 6, the pressure mounting system 6 is composed of: a torque arm 8, a mechanical clutch, namely, a pair of lock-pieces 22 causing the torque arm 8 and the gear 7 to mutually engage and disengage, and a pair of pressure-mounting actuators 10 rotatably fitted with a pair of arm pins 24, facing each other in parallel at the outer end of the torque arm 8.

The central portion of the torque arm is rotatably fitted on the upper side of the screw shaft 5 to lay the gear 7 in between in the vertical direction. The inner sides of the pair of lock-pieces 22 are rotatably fitted to the outer end of the torque arm 8 with a pair of pins 23, and the outer sides of both of the lock-pieces 22 are also rotatably fitted to the pair of pressure-mounting actuators 10 with the pair of arm pins 24. The pair of lockpieces 22 are formed with both gear teeth **22*a*, selectively interlocking with the gear 7 on each side. Each of the pressure-mounting actuators 10, is connected through a hydraulic tube (not shown) to the hydraulic source (not shown). Furthermore, at the other ends of both of the pressure-mounting actuators 10, a pair of blocks 9 are rotatably fitted to for receiving reactionary force. Stopper 8*a* is used to stop the lock-piece 22 when it is drawn back to disengage, and stopper 22*b* is used to stop the lock-piece 22** when it is pushed to engage.

A molding method will be explained with a molding of a firebrick as an example.

A composite material for a firebrick A is put into a space between a pedestal J and a metal mold I. The screw shaft 5 is rotated at high-speed in both directions by the hydraulic motor 12 so as to move a plunger 3 in the vertical direction to cause the composite material A to be repeatedly pressurized by the pressurization block 4.

After the composite material A is compressed to a specified height, the pressure-mounting actuator 10 is extended so as to cause the lock-piece 22, as shown in FIG. 5, to rotatably move to interlock the gear teeth **22*a* with the gear 7, thereby meshing the torque arm 8 and the gear 7 (FIG. 4). The pressure-mounting actuator 10 is further extended to cause the screw shaft 5 to be rotated through the gear 7 at a low-speed, thereby the composite material A to undergo the final pressurization. The final pressurization is controlled by a defined pressurizing force or compression mount. After completing the molding, in the inverted operation to the aforementioned operation, the gear teeth 22*a* and the gear 7 are mutually disengaged to disconnect the torque arm 8 from the gear 7. The final operation is completed when the plunger 3 is lifted by rotating the hydraulic motor 12** in the reverse direction.

When the final pressurization is carried out with repeated pressurization, by extending the pair of pressure-mounting actuators 10, a "bumping down molding" results from the vibrating movement of the torque arm 8 at infinitesimal stroke.

Figure 8:
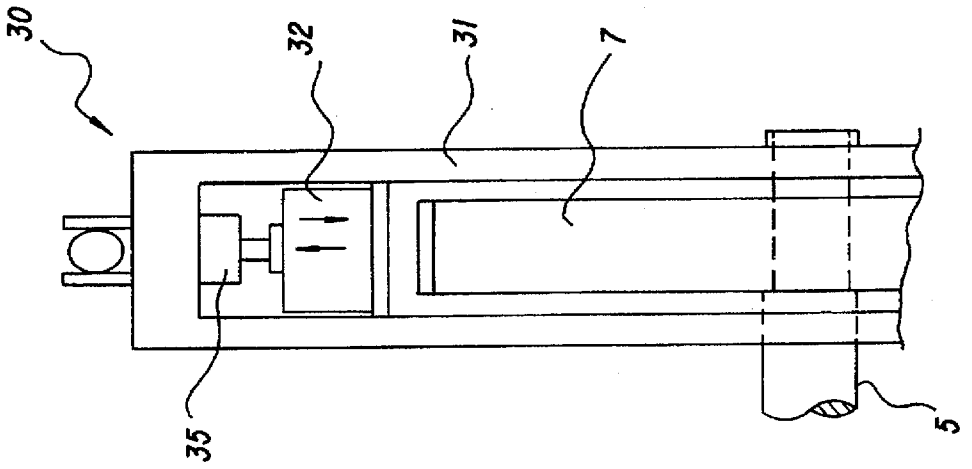
FIG. 8 is a view shown from the Z direction in FIG. 7.
Figure 7:
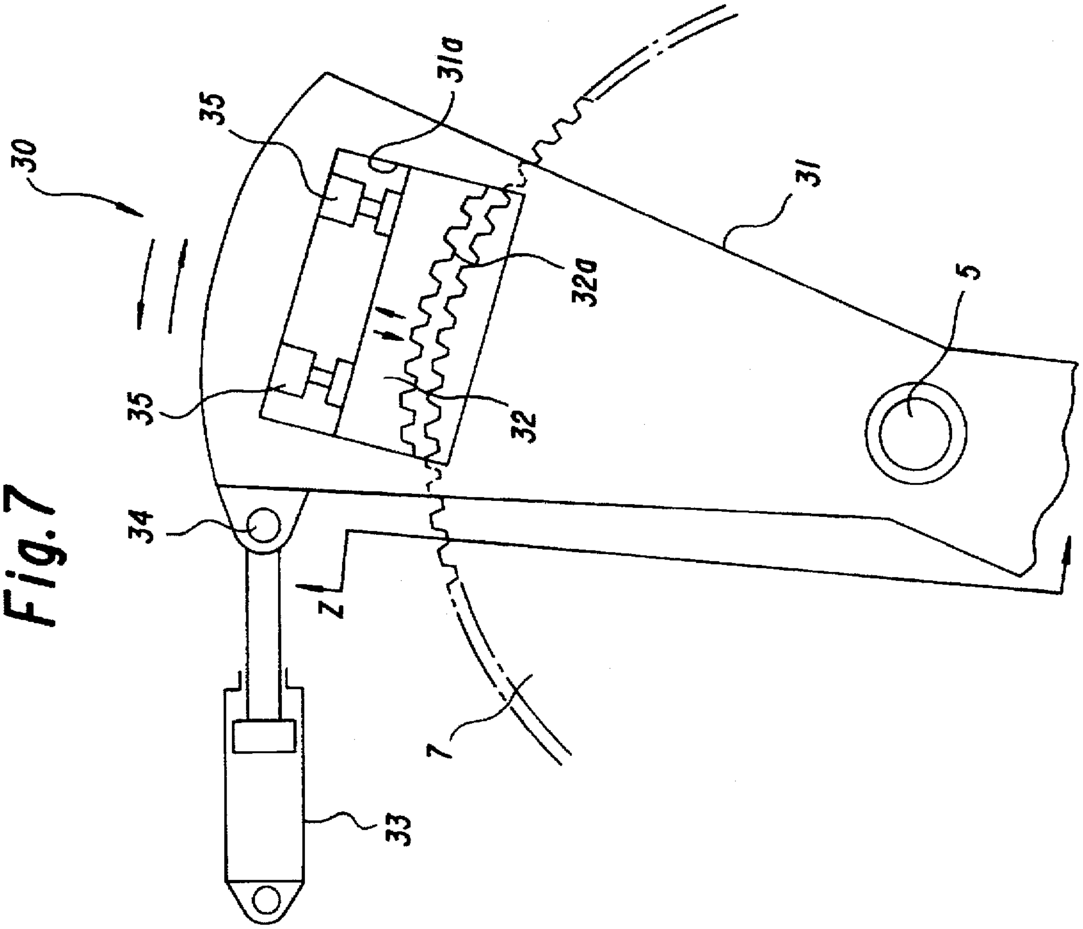
FIG. 7 is a plan view showing a pressure-mounting system of another embodiment according to the present invention.

FIG. 7 and FIG. 8 show another embodiment of the present invention. In a pressure-mounting system 30 of the embodiment, a torque arm 31, having a pair of fanned shape wings, is rotatably fired on the upper side of the screw shaft 5 to position the gear 7 in between in the vertical direction. The torque arm 31 is provided with a pair of quadrilateral windows **31*a* at both ends, in which each quadrilateral window 31*a* is provided therein with a mechanical clutch, namely, a lock-piece 32 to slidably move in a radial direction. At the inner side of the lock-piece 32, gear teeth 32*a* are formed to selectively interlock with the gear 7, and between the lock-piece 32 and the quadrilateral window 31*a*, a pair of detachable actuators 35 are provided to be parallel to one another. Furthermore, at the outer side of the torque arm 31, a pair of pressure-mounting actuators 33 are rotatably fitted with a pair of arm pins 34 so as to face each other in parallel at the outer ends of the torque arm 31**.

In this embodiment, after the pressurization caused by the hydraulic motor 12 is completed, the detachable actuator 35 is operated to thrust the lock-piece 32 in a state as shown in FIG. 7 in the radial direction, whereby, the gear teeth **32*a* are interlocked with the gear 7. The pressure-mounting actuator 33 is operated to add rotating force to the gear 7**.

Figure 9:
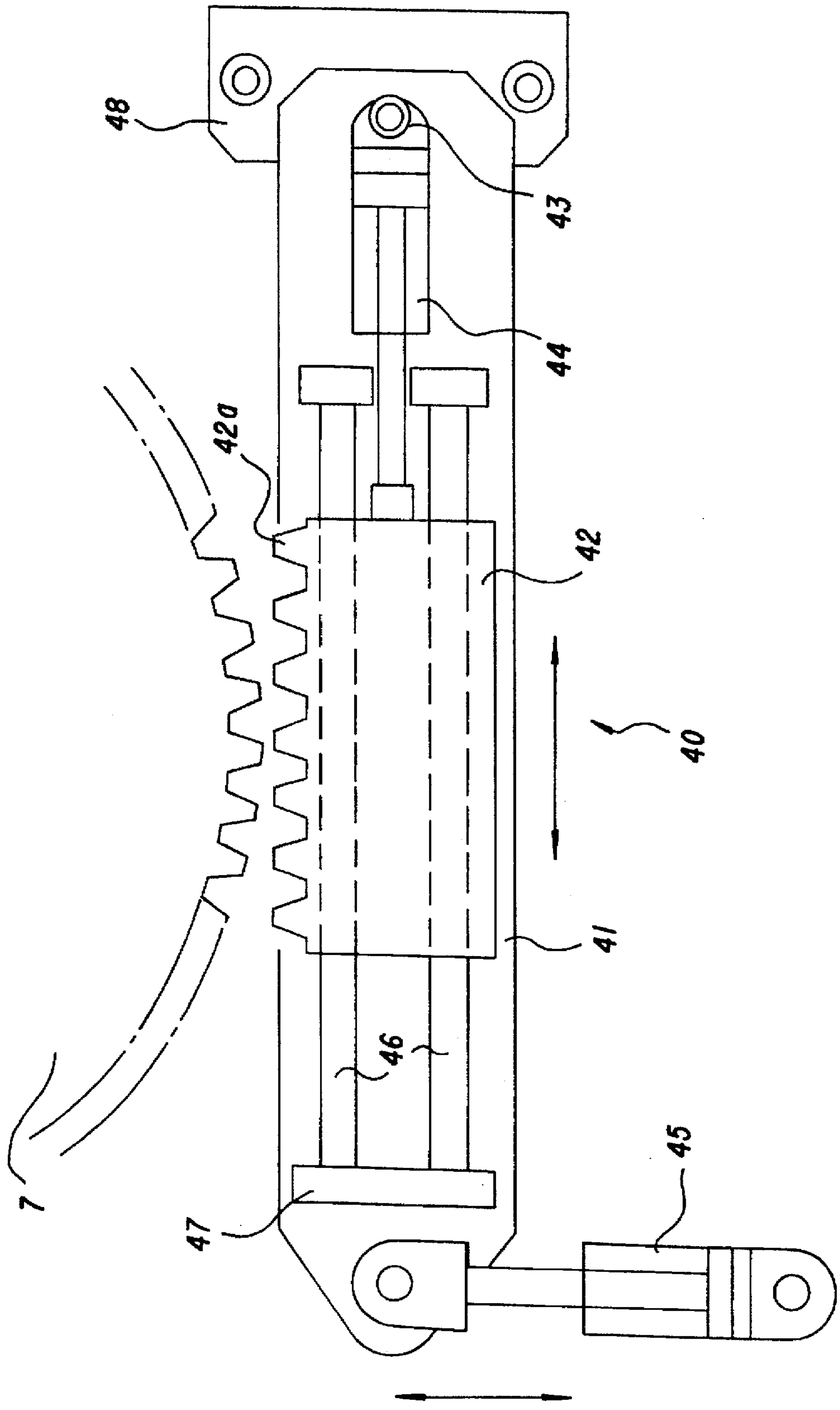
FIG. 9 is a plan view of a pressure-mounting system of yet another embodiment according to the present invention.

FIG. 9 shows yet another embodiment according to the present invention, and in a pressure-mounting system 40 of this embodiment, a base 48 is provided in the press frame 2 outside of the gear 7 in the radial direction, in which an end of a detachable arm 41 is rotatably fitted to the base 48 with the arm pin 43. A plate 47 is provided at the other end of the detachable arm 41, in which two guiding rods 46 are provided in parallel with each other in a direction at right angles to the plate 47. A lock-piece 42 is provided with the pair of guiding rods 46 to slidably move on the guiding rods 46. The lock-piece 42 is formed therein with gear teeth **42*a* selectively interlocking with the gear 7, and a further, between the outside of the lock-piece 42 and an arm pin 43, a pressure-mounting actuator 44 is relatively provided. Beyond the end of the detachable arm 41, a detachable actuator 45 is coupled to the detachable arm 41 at a right angle to the detachable arm 41**.

In this embodiment, after completing the pressurization caused by the hydraulic motor 12, the detachable actuator 45 is operated to interlock with the gear teeth **42*a* and the gear 7 by pushing the lock-piece 42 and the detachable arm 41, in a state as shown in FIG. 9 thus far, toward the gear 7. Next, the pressure-mounting actuator 44 is operated to add rotational force to the gear 7**, whereby the final pressurization take place.

Figure 10:
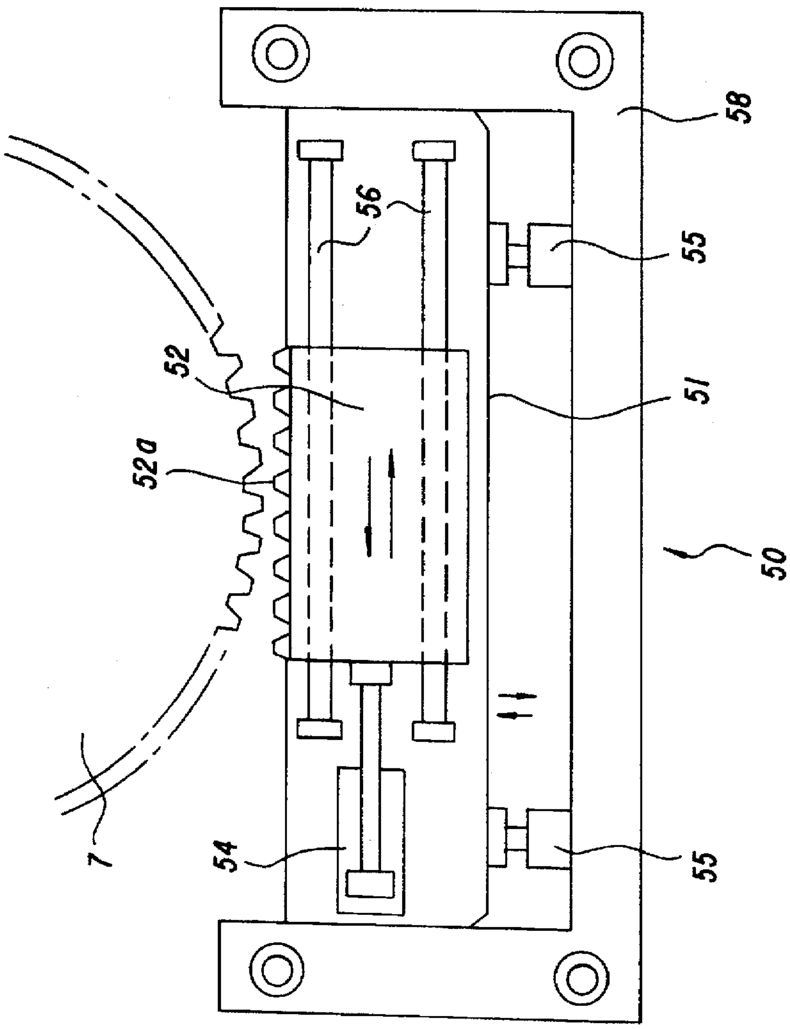
FIG. 10 is a plan view of a pressure-mounting system of a further embodiment according to the present invention.

FIG. 10 shows a further embodiment according to the present invention. In a pressure-mounting system 50, a U-shaped base 58 is provided in the press frame 2 outside of the gear 7 in the radial direction, in which a detachable arm 51 is provided at the base 58 to slidably move in the radial direction of the gear 7. Two guiding rods 56 are provided in parallel with each other in the longitudinal direction of the detachable arm 51, in which a lock-piece 52 is provided with the guiding rods 56 to slidably move on the guiding rods 56. The lock-piece 52 is formed therein with gear teeth **52*a* selectively interlocking with the gear 7, and a pressure-mounting actuator 54 is relatively provided between the end of the lock-piece 52 and the detachable arm 51. Beyond the end of the detachable arm 51, a detachable actuator 55 is provided at a right angle to the detachable arm 51**.

In this embodiment, after completing pressurization caused by the hydraulic motor 12, the detachable actuator 55 is operated to interlock the gear teeth **52*a* and the gear 7 by pushing the lock-piece 52 and the detachable arm 51, as shown in FIG. 10, towards the gear 7. Next, the pressure-mounting actuator 54 is operated to add rotational force to the gear 7**, and then the final pressurization takes place.

In the aforementioned explanation, the pressure-mounting systems 6, 30, 40, and 50 are symmetrically provided in a horizontal direction, but only one arm can be provided.

The present invention as described above provides the following beneficial effects:

(1) In the last stage of the pressurization, the great pressurizing force can be instantaneously applied.

(2) This apparatus can be provided in a simple, lightweight structure and at low-cost.

(3) Hydraulic pressure is input to the gear as torque instead of working as a direct pressurizing force, resulting in less wasted pressure, namely, wasted energy than in the conventional art.

What is claimed:

1. The compression molding apparatus, including a screw press comprising:

a pedestal;

a metal mold, said pedestal and said metal mold defining a cavity;

a plunger displaceable into and out of said cavity for compressing material therein;

a pressurization block connected to the plunger;

a rotatable screw shaft engaging said pressurization block to displace said pressurization block which correspondingly displaces said plunger into and out of said cavity upon rotation of said screw shaft;

a gear fixed to the screw shaft;

a driving device including a pinion for driving said gear; and a hydraulic pressure-mounting system for engaging and disengaging said gear and for driving said gear when engaged therewith to further compress said material in said cavity, wherein said pressure-mounting system comprises:

a torque arm rotatably fitted to the screw shaft;

a mechanical clutch rotatably fitted to an outer end of said torque arm providing engagement and disengagement between the torque arm and said gear by said clutch engaging and disengaging said gear; and a pressure-mounting actuator coupled to the mechanical clutch for displacing said clutch to engage and disengage said gear and for driving said gear when the clutch is engaged with the gear to further compress said material in said cavity.

2. The compression molding apparatus, including a screw press comprising:

a pedestal;

a metal mold, said pedestal and said metal mold defining a cavity;

a plunger displaceable into and out of said cavity for compressing material therein;

a pressurization block connected to the plunger;

a rotatable screw shaft engaging said pressurization block to displace said pressurization block which correspondingly displaces said plunger into and out of said cavity upon rotation of said screw shaft;

a gear fixed to the screw shaft;

a driving device including a pinion for driving said gear; and a hydraulic pressure-mounting system for engaging and disengaging said gear and for driving said gear when engaged therewith to further compress said material in said cavity, wherein said pressure-mounting system comprises:

a torque arm rotatably fitted to the screw shaft and provided therein with a window at an end of the torque arm;

a lock-piece, having gear teeth, provided in the window for sliding in the radial direction of said gear to have said gear teeth selectively interlocking with the gear;

a detachable actuator moving the lock-piece toward and away from said gear; and a pressure-mounting actuator rotatably fitted at the end of the torque arm for displacing said torque arm to drive said gear when the lock-piece is interlocked with the gear to further compress said material in said cavity.

3. The compression molding apparatus, including, a screw press comprising:

a pedestal;

a metal mold, said pedestal and said metal mold defining a cavity;

a plunger displaceable into and out of said cavity for compressing material therein;

a pressurization block connected to the plunger;

a rotatable screw shaft engaging said pressurization block to displace said pressurization block which correspondingly displaces said plunger into and out of said cavity upon rotation of said screw shaft;

a gear fixed to the screw shaft;

a driving device including a pinon for driving said gear; and a hydraulic pressure-mounting system for engaging and disengaging said gear and for driving said gear when engaged therewith to further compress said material in said cavity;

wherein said pressure-mounting system comprises:

a base fixed outside said gear in the radial direction;

a detachable arm, having a guiding shaft, rotatably fitted to the base at an end of the detachable arm;

a lock-piece having gear teeth selectively interlockable with said gear and slidably moving along said guiding shaft provided on the detachable arm;

a pressure-mounting actuator moving the lock-piece along said guiding shaft to drive said gear when the lock-piece is interlocked with the gear to further compress said material in said cavity; and a detachable-actuator fitted to the end of the other detachable arm for moving the detachable arm toward and away from the gear to selectively interlock said gear teeth with said gear.

4. The compression molding apparatus, including a screw press comprising:

a pedstal;

a metal mold, said pedestal and said metal mold defining a cavity;

a plunger displaceable into and out of said cavity for compressing material therein;

a pressurization block connected to the plunger;

a rotatable screw shaft engaging said pressurization block to displace said pressurization block which correspondingly displace said plunger into and out of said cavity upon rotation of said screw shaft;

a gear fixed to the screw shaft;

a driving device including pinion for driving said gear; and a hydraulic pressure-mounting system for engaging and disengaging said gear and for driving said gear when engaged therewith to further compress said material in said cavity, wherein said pressure-mounting system comprises:

a U-shaped base fixed outside of said gear in the radial direction;

a guide arm, having a guiding shaft, provided in the base for sliding in the radial direction of said gear;

a detachable actuator provided between the guide arm and the base for moving said guide arm in the radial direction of the gear;

a lock-piece having gear teeth selectively interlocked with said gear when said guide arm is moved by said detachable actuator and sliding along said guiding shaft of the guide arm; and a pressure-mounting actuator causing the locking to slide along said guiding shaft to drive said gear when the lock-piece is interlocked with the gear to further compress said material in said cavity.

* * * * *